H. C. LYONS

Feb. 2, 1932. Re. 18,347

VALVE

Original Filed Nov. 7, 1929

INVENTOR
Harry C. Lyons
BY
Wheeler & Beckert
ATTORNEYS

Reissued Feb. 2, 1932

Re. 18,347

UNITED STATES PATENT OFFICE

HARRY C. LYONS, OF MOUNT VERNON, NEW YORK

VALVE

Original No. 1,818,230, dated August 11, 1931, Serial No. 405,370, filed November 7, 1929. Application for reissue filed September 28, 1931. Serial No. 565,716.

My invention relates to valves for dispensing liquids, such as milk and cream, and is of particular utility as applied to so called measuring valves, the main object of the invention being to improve the mechanical construction whereby the same may be rendered not only compact and convenient to the operator, but may be easily and thoroughly cleansed—a factor of the greatest importance in the dispensing of the aforesaid liquid foods.

In the drawings I have shown the preferred form of the invention, in which—

Figure 1:
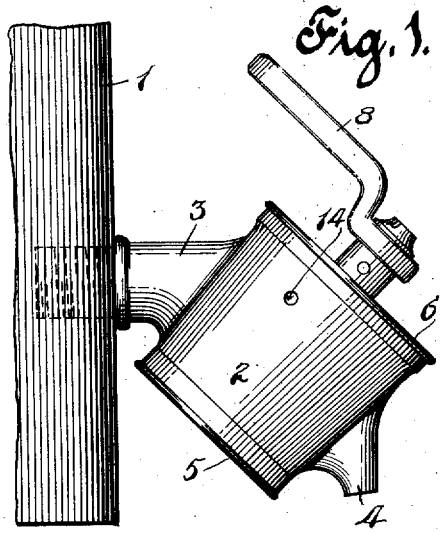
Fig. 1 is a side elevation of my valve as it would appear in use.
Figure 2:
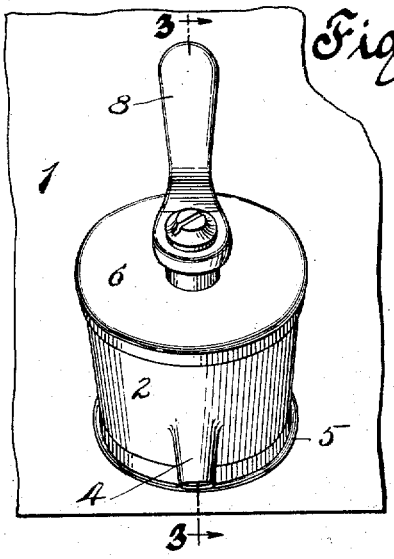
Fig. 2 is a front elevation of the same.
Figure 3:
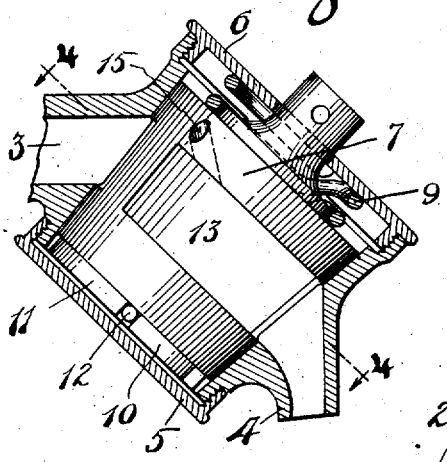
Fig. 3 is a side elevation of the valve proper, the casing and certain associated parts being shown in section.

1 represents a container designed to hold the liquid to be drawn off in measured quantities. The valve measuring mechanism by which the contents of the receptacle 1 are measured and delivered, comprises a casing or valve housing 2, the interior wall of which is slightly tapered. Projecting at an oblique angle from the interior of the housing 2 is an inlet connection 3, which is secured to the receptacle 1 in any desired way. Projecting from the opposite side of the casing 2 is a discharged nozzle 4, which is also by preference disposed at an oblique angle to the interior of said housing 1 so as to discharge downwardly. 5 is a removable cap for one end of the housing 3. 6 is a removable cap for the other end of the housing 3. These caps are secured to the housing in any suitable way, as by screw threads, so as to make a tight joint. 7 is a valve tapered to fit in the housing. The stem of the valve projects outwardly through cap 6 and carries a handle 8. Between the cap 6 and the upper end of the valve 7 is a spring 9, which tends to keep the valve snugly seated in the tapered bore in the housing 2. The bottom of the valve is provided with two segmental stop members, indicated respectively at 10 and 11. 12 is a stop pin, which passes diametrically through the bottom of the housing and stands in the spaces between the stop members 10 and 11 so as to permit the valve to be given approximately a quarter turn in either direction.

Figure 4:
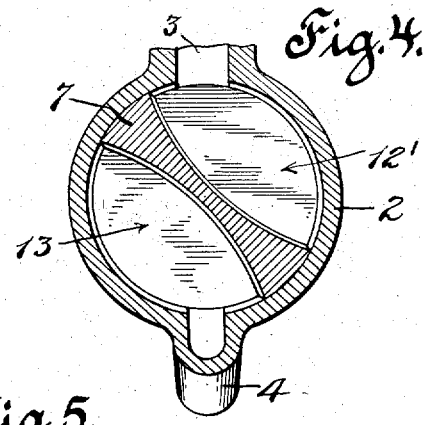
Fig. 4 is a section on the line 4—4 of Fig. 3.
Figure 5:
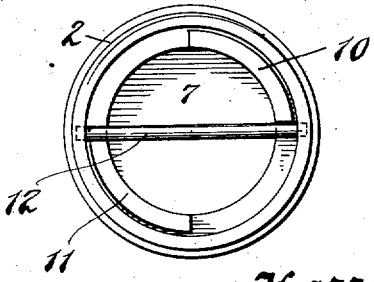
Fig. 5 is a view of the underside of the valve and the housing, the lower cap being removed.

At opposite sides of the valve body 7 are two recessed portions, indicated respectively at 12′—13 (Fig. 4). These spaces are of a size to contain a predetermined measured quantity of the fluid to be dispensed. Assuming the valve stands in the position indicated in Fig. 4, it will be seen that this measuring space 12′ is in open communication with the interior of the receptacle through the inlet 3. Thus, the liquid contents of the receptacle may flow and fill this space 12′. When it is desired to discharge the fluid from space 12′, the valve is turned by the handle in a clockwise direction as viewed in Fig. 4, thus turning the space 12′ into a position to register with the discharge nozzle 4, through which said measured contents may then flow out. This movement of the valve puts the measuring space 13 in communication with the interior of the receptacle 1 through the inlet 3, so that part of the contents may then flow into and fill this space. When it is desired to discharge the liquid in space 13, the valve is turned back again to the position shown in Fig. 4, causing space 13 to register with the outlet nozzle 4.

I am aware that measuring valves of this type are not broadly new, but heretofore great difficulty has been experienced in properly cleaning the interior wall of the inlet 3 and the interior wall of the outlet nozzle 4. By the present construction this cleansing of these walls may be quickly and perfectly done, since by removing the cap 6 and withdrawing the valve, the opening at the top of the housing 2 gives complete and perfect access to the bore of the inlet 3 and the bore of the discharge nozzle 4. It will be noted that in my device the projection of the bore of the inlet 3 and the projection of the bore of the discharge nozzle 4 both pass through the opening in the end of the housing 2, through which the valve 7 is inserted and removed. By this construction ample room is afforded to permit a suitable cleansing tool to be inserted in said bores and operated for the perfect cleaning of the walls of said parts. Again, by this construction the operator may look into said bores and inspect the work of cleaning and determine whether it has been perfectly done. It is well known that in the dispensing of milk, cream or the like, any film remaining on the walls of these parts when the receptacle 1 is empty may constitute a medium for breeding dangerous bacteria and thus contaminate fresh milk or cream passing therethrough. It is therefore exceedingly important not only to make the act of cleaning easy, but also to permit of ready inspection. To that end I have so constructed the housing and associated parts that by the mere act of removing the cap 6 and the valve 7 the user may accomplish this cleaning operation easily and quickly and may actually look through said bores to see whether his work has been thoroughly done. 14 represents a vent that may be provided in the side wall of the housing 2. 15 represents a vent passage in one side of the valve 7 leading to the space 13. When the space 13 registers with the nozzle 4 these vents 14—15 register to permit air to enter the space 13 and thus permit the ready outflow of the liquid contents of the chamber 13. Similar vents may be provided on the other side of the measuring device to vent the space 12′ when the latter registers with the discharge nozzle.

What I claim is:

1. In a measuring valve, a valve housing, a valve mounted therein and having measuring chambers in opposite sides thereof, said valve being rotatable to two different operative positions, an opening in the outer end of the housing for permitting the valve to be inserted and removed, a cap for said opening, an inlet projecting angularly from the side wall of the valve housing, the projection of the bore of said inlet passing through the opening in said housing through which the valve is inserted and removed, a discharge nozzle on the opposite side of said housing, the passage through the nozzle and the passage through the inlet registering alternately with the measuring chambers in said valve as said valve is rotated from one to another of its operative positions.

2. In a measuring valve, a valve housing, a valve mounted therein and having measuring chambers in opposite sides thereof, said valve being rotatable to two different operative positions, an opening in the outer end of the housing for permitting the valve to be inserted and removed, a cap for said opening, an inlet projecting angularly from the side wall of the valve housing, the projection of the bore of said inlet passing through the opening in said housing through which the valve is inserted and removed, a discharge nozzle on the opposite side of said housing, the passage through the nozzle and the passage through the inlet registering alternately with the measuring chambers in said valve as said valve is rotated from one to another of its operative positions, the projection of the bore through said nozzle passing through said opening in said housing.

3. In a measuring valve, a valve housing, a valve mounted therein and having measuring chambers in opposite sides thereof, said valve being rotatable to two different operative positions, an opening in the outer end of the housing for permitting the valve to be inserted and removed, a cap for said opening, an inlet projecting angularly from the side wall of the valve housing, the projection of the bore of said inlet passing through the opening in said housing through which the valve is inserted and removed, a discharge nozzle on the opposite side of said housing, the passage through the nozzle and the passage through the inlet registering alternately with the measuring chambers in said valve as said valve is rotated from one to another of its operative positions, and a stop mechanism at the bottom of said valve to permit said valve to be rotated only approximately one quarter of a turn.

4. In an apparatus for dispensing liquid foods, a container, a dispensing valve mechanism therefor, comprising a valve housing having an opening at one end, an inlet leading from said container into said valve housing and directed toward the open end of the latter, to afford free access into the same for inspection and cleaning from the outside of the housing, a valve removably mounted in said housing to control said inlet passage, and an outlet passage from said housing.

5. In an apparatus for dispensing liquid foods, a container, a dispensing valve mechanism therefor, comprising a valve housing having an opening at one end, an inlet leading from said container into said valve housing and directed toward the open end of the latter, to afford free access into the same for inspection and cleaning from the outside of the housing, a valve removably mounted in said housing to control said inlet passage, and an outlet passage from said housing, said outlet passage being also directed toward said opening to facilitate inspection and cleaning of the same when said valve is removed.

HARRY C. LYONS.